(12) United States Patent
Kaneko et al.

(10) Patent No.: US 7,740,323 B2
(45) Date of Patent: Jun. 22, 2010

(54) HYDRAULIC DRIVE DEVICE FOR VERTICAL PIVOTING MOVEMENT OF LOAD CARRYING PLATFORM

(75) Inventors: Satoru Kaneko, Tsuchiura (JP); Tomohiko Yasuda, Tsuchiura (JP); Takashi Yagyu, Tsuchiura (JP); Yasuo Tanaka, Tsuchiura (JP); Michio Fushiki, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 83 days.

(21) Appl. No.: 12/065,409

(22) PCT Filed: Aug. 30, 2006

(86) PCT No.: PCT/JP2006/317051

§ 371 (c)(1),
(2), (4) Date: Feb. 29, 2008

(87) PCT Pub. No.: WO2007/026734

PCT Pub. Date: Mar. 8, 2007

(65) Prior Publication Data

US 2009/0102273 A1    Apr. 23, 2009

(30) Foreign Application Priority Data

Sep. 2, 2005    (JP)    ............... 2005-255062

(51) Int. Cl.
*B60P 1/04*        (2006.01)
*F15B 11/028*      (2006.01)
*F15B 11/04*       (2006.01)
*F15B 11/08*       (2006.01)

(52) U.S. Cl. .................... 298/22 C; 298/22 P
(58) Field of Classification Search .............. 298/22 C, 298/17 R, 19 R, 22 R, 22 P
See application file for complete search history.

(56) References Cited

U.S. PATENT DOCUMENTS 4,129,987 A    12/1978    Blume (Continued)

FOREIGN PATENT DOCUMENTS

JP    51-126509    4/1975

(Continued)

OTHER PUBLICATIONS

International Search Report dated Nov. 28, 2006 w/English translation (four (4) pages).

*Primary Examiner*—Patricia L Engle
(74) *Attorney, Agent, or Firm*—Crowell & Moring LLP (57) ABSTRACT

In a hydraulic drive device for vertical pivoting movement of a load carrying platform, a first directional control valve has only three switchover positions, including a neutral position relating to operation of stopping and holding a load carrying platform, a switching position relating to operation of lifting the load carrying platform, and a switch over position relating to operation of forced lowering of the load carrying platform. A second directional control valve has only three switchover positions, including a neutral position, a switching position, and a switchover position relating to operation of allowing the load carrying platform to fall by its own weight. The device includes a first on-off valve, a second on-off valve, and a third on-off valve that are proportional control solenoid valves for switching an appropriate one of the first and second directional control valves.

8 Claims, 3 Drawing Sheets

U.S. PATENT DOCUMENTS

| | | | |
|---|---|---|---|
| 4,508,388 A * | 4/1985 | Minami | 298/22 C |
| 4,753,269 A | 6/1988 | Klein | |
| 5,141,288 A * | 8/1992 | Smith | 298/17.6 |
| 6,568,763 B2 * | 5/2003 | Uematsu et al. | 298/22 C |
| 6,922,923 B2 | 8/2005 | Kondou | |
| 7,500,360 B2 * | 3/2009 | Udagawa et al. | 60/421 |
| 2004/0207230 A1 * | 10/2004 | Smith | 296/98 |
| 2009/0218875 A1 * | 9/2009 | Tamura et al. | 298/22 C |

FOREIGN PATENT DOCUMENTS

| | | |
|---|---|---|
| JP | 58-206431 A | 12/1983 |
| JP | 2-150225 | 12/1990 |
| JP | 11-71788 A | 3/1999 |
| JP | 2001-105954 A | 4/2001 |
| JP | 2002-181004 A | 6/2002 |

* cited by examiner

HYDRAULIC DRIVE DEVICE FOR VERTICAL PIVOTING MOVEMENT OF LOAD CARRYING PLATFORM

TECHNICAL FIELD

This invention relates to a hydraulic drive system for vertical pivoting movement of a load carrying platform (which may be referred to as "platform" for the sake of brevity), which can be arranged on a dump truck and can perform four operations, that is, a platform raising operation, a platform forced-lowering operation, a platform free-fall permitting operation and a platform stay holding operation.

BACKGROUND ART

Conventional technologies of this sort include the hydraulic drive system disclosed in JP-A-2001-105954. This conventional technology is equipped with a pair of hoist cylinders for vertically pivoting a body, in other words, a load carrying platform, a hydraulic pump for feeding pressure oil that operates these hoist cylinders, and a hoist valve, specifically a directional control valve arranged between the hydraulic pump and the hoist cylinders to control an operation of the hoist cylinders.

Only one directional control valve is arranged as the directional control valve. This directional control valve has four switch positions, which are a switch position for performing a platform raising operation to pivot the load carrying platform in an upward direction, a switch position for performing a platform forced-lowering operation to forcedly pivot the load carrying platform in a downward direction by pressure oil delivered from the hydraulic pump, a switch position for performing a platform free-fall permitting operation to pivot the load carrying platform in a downward direction by its own weight, and a switch position for performing a platform stay holding operation to enable the holding of an aerial stay of the load carrying platform, in other words, a neutral position. It is to be noted that the switch position for performing the above-mentioned platform free-fall permitting operation is formed between the neutral position and the switch position for performing the above-mentioned platform forced-lowering operation.

The conventional technology is constructed to also include, as a switching control means capable of outputting a pilot pressure to switch this directional control valve, a solenoid proportional pressure control valve controllable in opening area responsive to an analog signal outputted from a controller and connected to an auxiliary hydraulic pump, i.e., a pilot pump and a directional solenoid valve switchable to one of two switch positions responsive to a digital signal outputted from the controller to feed a pilot pressure, which has been outputted from the solenoid proportional pressure control valve, to one of left and right control ports of the above-mentioned directional control valve.

In this conventional technology, the solenoid proportional pressure control valve is controlled by the analog signal outputted from the controller, and the directional solenoid valve is switched by the digital signal outputted from the controller. By the pilot pressure outputted from the directional solenoid valve, the directional control valve is switched to one of the above-mentioned switch position for performing the platform raising operation, the above-mentioned switch position for performing the platform forced-lowering operation and the above-mentioned switch position for performing the platform free-fall permitting operation, whereby the pressure oil delivered from the hydraulic pump is fed to the hoist cylinder via the directional control valve to perform the corresponding operation.

When the output of the pilot pressure from the solenoid proportional pressure control valve is stopped by control from the controller, the directional control valve returns to the neutral position to perform the above-mentioned platform stay holding operation.

SUMMARY OF THE INVENTION

To feed a pilot pressure that switches the directional control valve to an adequate position, the above-mentioned conventional technology requires control of the opening area of the solenoid proportional pressure control valve by an analog signal, said control requiring high accuracy, and also control of the directional solenoid valve by a digital signal. The directional control valve is a special directional control valve having four switch positions. Further, the switch position for performing the platform free-fall permitting operation exists between the neutral position and the switch position for performing the platform forced-lowering operation, so that switching control of the directional control valve, for example, switching control of the directional control valve to switch the directional control valve to the switch position for performing the above-mentioned platform free-fall permitting operation tends to become difficult. Consequently, complex switching control of the directional control valve is required, and moreover, the manufacture of a directional control valve of complex structure is required. For these reasons, the conventional technology involves a potential problem of higher manufacturing cost.

The directional control valve is in a complex configuration having four switch positions, and requires higher manufacturing cost compared with directional control valves commonly arranged in hydraulic drive systems for construction machines, specifically directional control valves each having three switch positions consisting of a neutral position and left and right switch positions. For example, comparing the use of two directional control valves of a simple structure having three switch positions with the use of one directional control valve having four switch positions as mentioned above, the directional control valve having the four switch positions will be a custom-made product of complex configuration so that the manufacturing cost of the directional control valve as the custom-made product will tend to become higher.

With the above-mentioned actual situation of the conventional technology in view, the present invention has as an object thereof the provision of a hydraulic drive system for vertical pivoting movement of a load carrying platform, which can simplify switching control of a directional control valve and can adopt a directional control valve of simple structure as a directional control valve for controlling operations of a hoist cylinder.

To achieve the above-described object, the present invention is characterized in that in a hydraulic drive system for vertical pivoting movement of a load carrying platform, said hydraulic drive system being to be mounted on a dump truck and being provided with a hoist cylinder for vertically pivoting the load carrying platform, a hydraulic pump for feeding pressure oil to operate the hoist cylinder, a directional control valve arranged between the hydraulic pump and the hoist cylinder to control operations of the hoist cylinder and having switch positions for performing a platform raising operation to pivot the load carrying platform in an upward direction, a platform forced-lowering operation to forcedly pivot the load carrying platform in a downward direction by pressure oil delivered from the hydraulic pump, a platform free-fall permitting operation to pivot the load carrying platform in a downward direction by its own weight and a platform stay holding operation to enable holding of an aerial stay of the load carrying platform, respectively, and a switching control means capable of outputting a pilot pressure to switch the directional control valve, the directional control valve comprises a first directional control valve having a neutral position relevant to platform stay holding operations and two other switch positions, and a second directional control valve having a neutral position relevant to platform stay holding operations and two other switch positions; four switch positions, which consist of the two other switch positions of the first directional control valve and the two other switch positions of the second directional control valve, are assigned to the switch position relevant to platform raising operations, the switch position relevant to platform forced-lowering operations and the switch position relevant to platform free-fall permitting operations; and the switching control means comprises a first on-off valve having an ON position capable of outputting a pilot pressure to perform the platform raising operation and an OFF position enabling the platform stay holding operation, a second on-off valve having an ON position capable of outputting a pilot pressure to perform the platform free-fall permitting operation and an OFF position enabling the platform stay holding operation, and a third on-off valve having an ON position capable of outputting a pilot pressure to perform the platform forced-lowering operation and an OFF position enabling the platform stay holding operation.

In the present invention constructed as described above, by switching the first on-off valve to the ON position and the second on-off valve and third on-off valve to the OFF positions, at least one corresponding of the first directional control valve and second directional control valve is switched to the switch position relevant to platform raising operations, the pressure oil delivered from the hydraulic pump is fed to a bottom chamber of the hoist cylinder via the at least one corresponding of the first directional control valve and second directional control valve, the return oil from a rod chamber of this hoist cylinder is returned to a reservoir, the hoist cylinder is caused to extend, and therefore, a platform raising operation can be performed.

By switching the third on-off valve to the ON position and the first on-off valve and second on-off valve to the OFF positions, at least one corresponding of the first directional control valve and second directional control valve is switched to the switch position relevant to platform forced-lowering operations, the pressure oil delivered from the hydraulic pump is fed to the rod chamber of the hoist cylinder via the at least one corresponding of the first directional control valve and second directional control valve, the return oil from the bottom chamber of this hoist cylinder is returned to the reservoir, the hoist cylinder is caused to retract, and therefore, a platform forced-lowering operation can be performed.

By switching the second on-off valve to the ON position and the first on-off valve and third on-off valve to the OFF positions, at least one corresponding of the first directional control valve and second directional control valve is switched to the switch position relevant to platform free-fall permitting operations, the bottom chamber of the hoist cylinder is brought into connection with the reservoir, the feeding of the pressure oil, which is delivered from the hydraulic pump, to the rod chamber of the hoist cylinder is prevented, and therefore, a platform free-fall permitting operation can be performed.

By switching all the first on-off valve, second on-off valve and third on-off valve to the OFF positions, the first directional control valve and second directional control valve are switched to the neutral positions relevant to platform stay holding operations, and therefore, a platform stay holding operation can be performed.

As has been described above, each one of the four operations consisting of the platform raising operation, the platform forced-lowering operation, the platform free-fall permitting operation and the platform stay holding operation can be realized by simply on-off controlling the first on-off valve, second on-off valve and third on-off valve to switch the at least one corresponding of the first directional control valve and second directional control valve, thereby making it possible to simplify the switching control of the first directional control valve and second directional control valve.

The first directional control valve and second directional control valve each have only three switch positions including the neutral position, and therefore, their structures can be simplified compared with the directional control valve having four switch positions and available as a custom-made product.

The present invention can also be characterized in that in the invention described above, the two other switch positions of the first directional control valve are the switch position relevant to platform raising operations and the switch position relevant to platform forced-lowering operations; the two other switch positions of the second directional control valve are the switch position relevant to platform raising operations and the switch position relevant to platform free-fall permitting operations; the ON position of the first on-off valve is an ON position capable of outputting the pilot pressure, which acts to perform the platform raising operation, to a control port of the first directional control valve and a control port of the second directional control valve; the ON position of the second on-off valve is an ON position capable of outputting the pilot pressure, which acts to perform the platform free-fall permitting operation, to another control port of the second directional control valve; and the ON position of the third on-off valve is an ON position capable of outputting the pilot pressure, which acts to perform the platform forced-lowering operation, to another control port of the first directional control valve.

The present invention can also be characterized in that in the invention described above, the hydraulic drive system further comprises a pull-out restraining means for restraining occurrence of a pull-out, which is a devastating extension of the hoist cylinder that may occur during the platform raising operation.

The present invention can also be characterized in that in the invention described above, the pull-out restraining means comprises a restrictor arranged at the switch position relevant to platform raising operations out of the three switch positions of the second directional control valve.

The present invention can also be characterized in that in the invention described above, the hydraulic drive system further comprises a load adjusting means for adjusting a depressing load on a truck frame of the load carrying platform during the platform forced-lowering operation.

The present invention can also be characterized in that in the invention described above, the load adjusting means comprises a relief valve arranged in a line connecting a bottom chamber of the hoist cylinder and a reservoir with each other.

ADVANTAGEOUS EFFECTS OF THE INVENTION

The present invention can perform each one of the four operations, which consist of the platform raising operation, the platform forced-lowering operation, the platform free-fall permitting operation and the platform stay holding operation, by simply on-off controlling the first on-off valve, second on-off valve and third on-off valve to switch at least one corresponding of the first directional control valve and second directional control valve. It is, therefore, possible to simplify the switching control of these first directional control valve and second directional control valve in comparison with the conventional directional control valve. As the first directional control valve and second directional control valve each have only three switch positions including the neutral position, they can be structurally simplified compared with the conventional directional control valve. These first directional control valve and second directional control valve can, therefore, realize similar functions as the conventional directional control valve at lower manufacturing cost than the conventional directional control valve.

DETAILED DESCRIPTION OF THE PREFERRED EMBODIMENTS

The hydraulic drive system according to the present invention for vertical pivoting movement of a load carrying platform will hereinafter be described based on the drawings.

[Basic Construction of Dump Truck]

Figure 1:
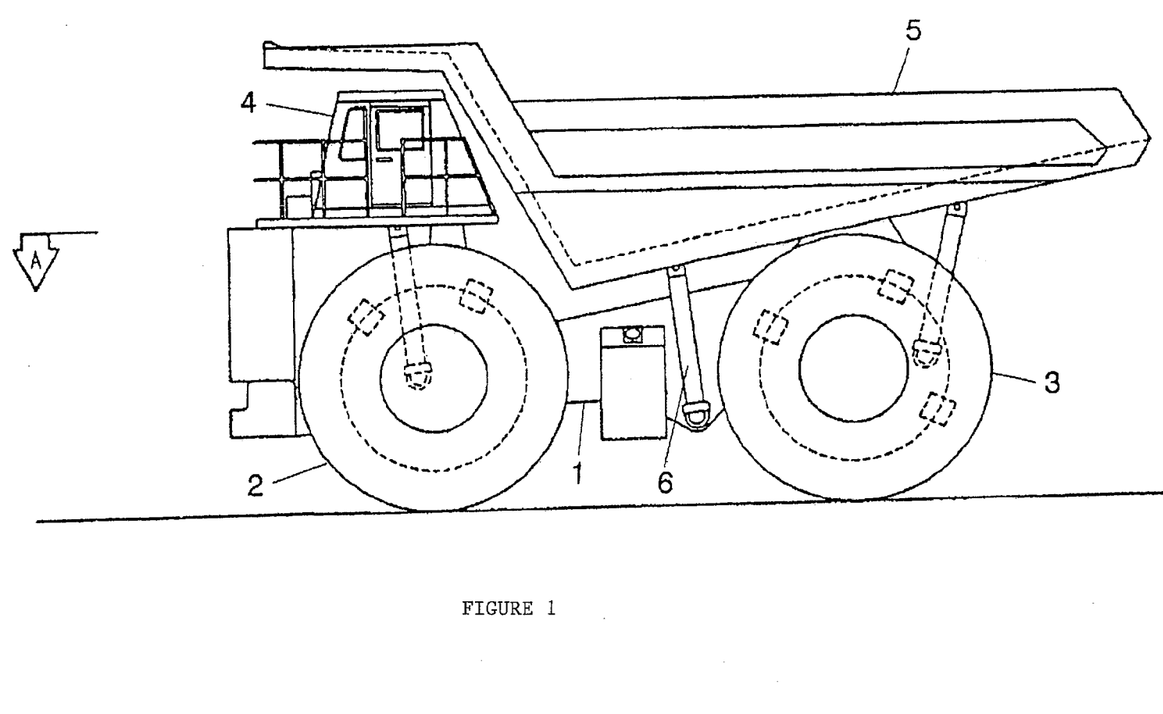
FIG. 1 is a side view of a dump truck on which one embodiment of the hydraulic drive system according to the present invention for vertical pivoting movement of a load carrying platform can be arranged.
Figure 2:
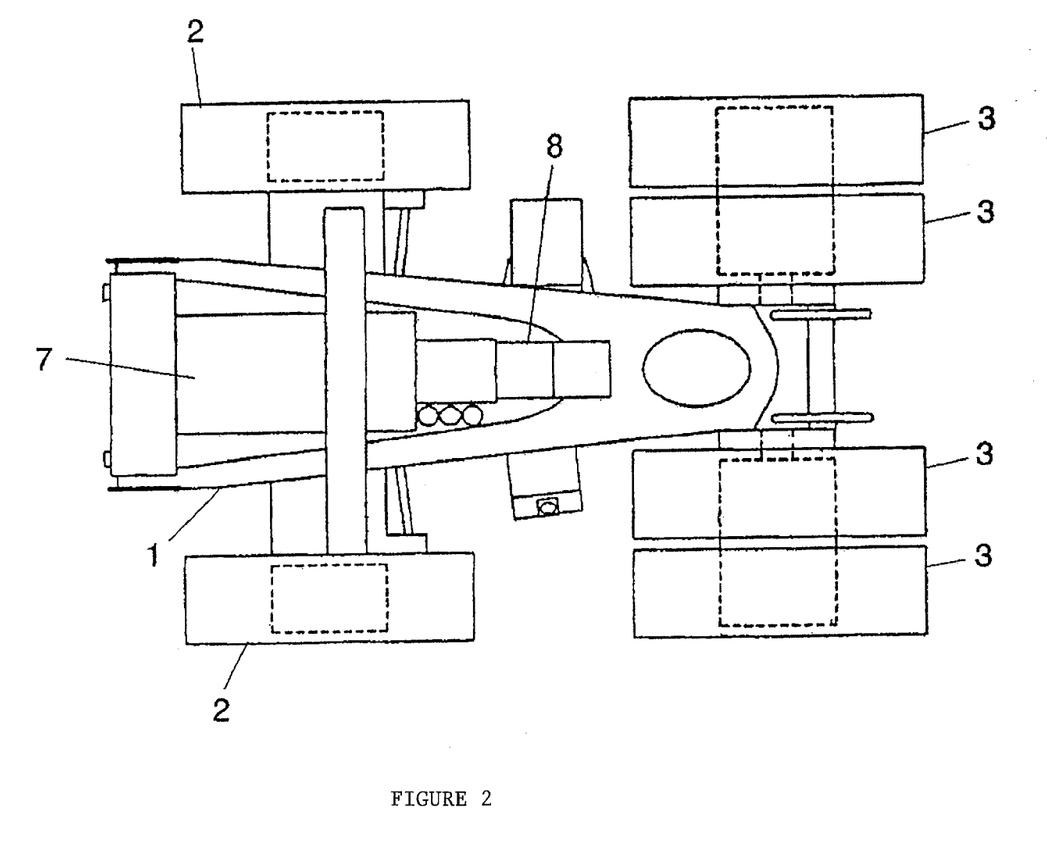
FIG. 2 is a view taken in the direction of arrow A of FIG. 1.

FIG. 1 is a side view of a dump truck on which one embodiment of the hydraulic drive system according to the present invention for vertical pivoting movement of a load carrying platform can be arranged, and FIG. 2 is a view taken in the direction of arrow A of FIG. 1.

The dump truck on which one embodiment of the hydraulic drive system according to the present invention for vertical pivoting movement of a load carrying platform can be arranged is, for example, an off-load dump truck useful in a mine or the like. As illustrated in FIGS. 1 and 2, the dump truck is provided with a truck frame 1 and also with front wheels 2, rear wheels 3 and a cab 4 all of which are mounted on the truck frame 1. As depicted in FIG. 1, the dump truck is also provided with a load carrying platform 5 mounted on the truck frame 1 such that the load carrying platform 5 can be vertically pivoted, specifically can be turned in an upward direction and also can be turned in a downward direction, both about a fulcrum set in a rear part, and also with a pair of left and right hoist cylinders 6 for turning the load carrying platform 5 in up-and-down direction. As shown in FIG. 2, the dump truck is also provided with an engine 7 and a hydraulic pump 8 drivable by the engine 7 to feed pressure oil for operating the hoist cylinders 6.

[Construction of the Embodiment]

Figure 3:
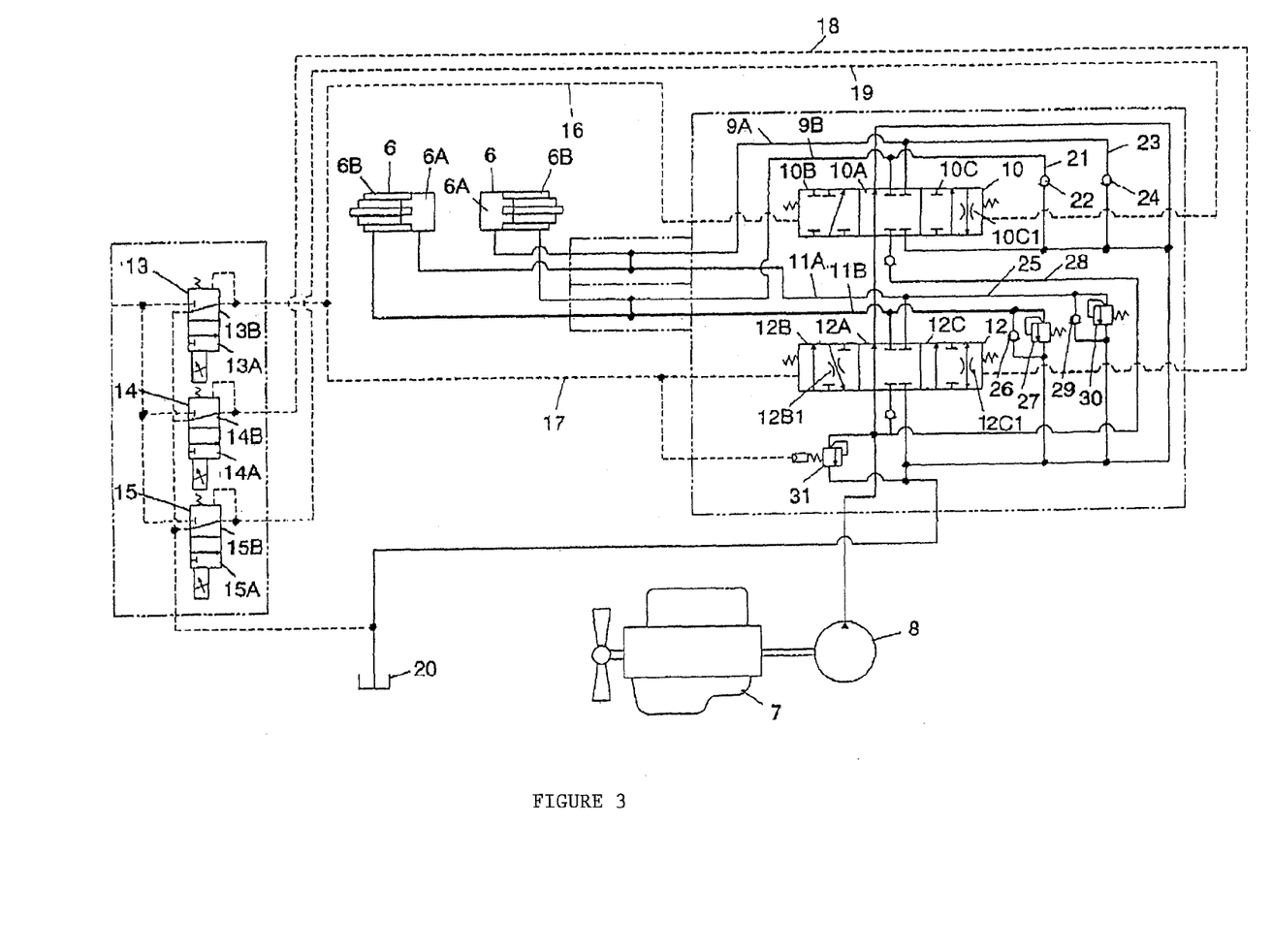
FIG. 3 is a hydraulic circuit diagram illustrating the one embodiment of the present invention.

FIG. 3 is a hydraulic circuit diagram illustrating the one embodiment of the present invention As shown in FIG. 3, this embodiment is provided with directional control valves between the above-mentioned hydraulic pump 8 and the above-mentioned paired hoist cylinders 6 to control operations of these hoist cylinders 6. These directional control valves consist of a first directional control valve 10 having three switch positions, that is, a neutral position 10A relevant to a platform stay holding position enabling the holding of an aerial stay of the load carrying platform 5 and two other switch positions 10B,10C and a second directional control valve 12 having three switch positions, that is, a neutral position 12A relevant to a platform stay holding position and two other switch positions 12B,12C.

The switch positions, which consist of the above-mentioned two other switch positions 10B,10C of the first directional control valve 10 and the above-mentioned two other switch positions 12B,12C of the second directional control valve 12, are assigned to a switch position relevant to an operation for dumping earth, sand or the like loaded on the load carrying platform 5, i.e., a platform raising operation for turning the load carrying platform 5 in the upward direction, a switch position relevant to a platform forced-lowering operation for forcedly turning the load carrying platform 5 in the downward direction by pressure oil delivered from the hydraulic pump 8, for example, after dumping, and a switch position relevant to a platform free-fall permitting operation for turning the load carrying platform 5 in the downward direction by its own weight.

For example, the above-mentioned two other switch positions 10B,10C of the first directional control valve 10 are set as the switch position 10B relevant to the platform raising operation and the switch position 10C relevant to the platform forced-lowering operation. The above-mentioned switch position 10B is a switch position at which pressure oil from the hydraulic pump 8 can be fed to bottom chambers 6A of the paired hoist cylinder 6 via a main line 9A. It is to be noted that a restrictor 10C1 is arranged at the switch position 100 to perform control such that the descending speed for the load carrying platform 5 does not become excessively high during a platform forced-lowering operation.

Further, the above-mentioned two other switch positions 12B,12C of the second directional control valve 12 are set as the switch position 12B relevant to the platform raising operation and the switch position 12C relevant to the platform free-fall permitting operation. The above-mentioned switch position 12B is the switch position at which oil in rod chambers 6B of the hoist cylinders 6 is returned to a reservoir 20 via a main line 11B.

In general, if the turn angle of the load carrying platform 5 exceeds a predetermined angle, for example, due to an excessively high raising speed during a platform raising operation, devastating extensions of the hoist cylinders 6, in other words, a pull-out may occur as a result of a sudden fall of blocks of earth, sand or the like. In this embodiment, a restrictor 12B1 is arranged as a pull-out restraining means at the change position 12B of the second directional control valve 12 to restrain the occurrence of such a pull-out. By retarding by this restrictor 12B1 the flow-out of the oil which is being returned to the reservoir 20, control is effected such that smooth dumping of earth, sand or the like from the load carrying platform 5 can be performed without making the platform raising speed too high.

At the switch position 12C, on the other hand, a restrictor 12C1 is arranged to perform control such that the descending speed of the load carrying platform 5 does not become excessively high during a platform free-fall permitting operation.

The main line 9A, which connects the first directional control valve 10 and the bottom chambers 6A of the hoist cylinders 6 together, and the main line 11A, which connects the second directional control valve 12 and the bottom chambers 6A of the hoist cylinders 6 together, are connected with each other. Similarly, the main line 9B, which connects the first directional control valve 10 and the rod chambers 6B of the hoist cylinders 6 together, and the main line 11B, which connects the second directional control valve 12 and the rod chambers 6B of the hoist cylinders 6 together, are also connected with each other.

Further, a first check valve 22 is arranged in a line, which connects the main line 9B and the reservoir 20 together, to prevent any reverse flow of pressure oil toward the reservoir 20. A second check valve 24 is arranged in a line 23, which connects the main line 9A and the reservoir 20 with each other, to prevent any reverse flow of pressure oil toward the reservoir 20.

In a line 25 that connects the main line 11B and the reservoir 20 together, a third check valve 26 which prevents any reverse flow of pressure oil toward the reservoir 20 and a first relief valve 27 are arranged in parallel with each other. If any pull-out occurs despite the arrangement of the above-mentioned pull-out restraining means, i.e., the restrictor 12B1 and the pressure in the rod chambers 6B of the hoist cylinders 6 becomes excessively high, the first relief valve 27 acts to relieve the excessively high pressure in the rod chambers 6B to the reservoir 20 to avoid breakage of portions, which are associated with the hoist cylinders 6, by the excessively high pressure.

On the other hand, in a line 28 that connects the main line 11A and the reservoir 20 together, a fourth check valve 29 which prevents any reverse flow of pressure oil toward the reservoir 20 and a second relief valve 30 are arranged in parallel with each other. The second relief valve 30 constitutes a load adjusting means which adjusts the depressing load of the load carrying platform 5 onto the truck frame 1 to prevent it from becoming excessively high during a platform forced-lowering operation.

It is to be noted that the occurrence of a pull-out can be basically restrained by the above-mentioned pull-out restraining means, i.e., the restrictor 12B1 arranged at the switch position 12B of the second directional control valve 12 but a pull-out may still occur. In such a case, there occurs, as a back action of this pull-out, a kick-back that the hoist cylinders 6 are momentarily and abruptly reversed and operated in the retracting directions. Like the occurrence of the pull-out, the occurrence of such a kick-back is not preferred for the assurance of smooth workability. Concerning such a kick-back, this embodiment can draw oil as much as needed from the reservoir 20 into the bottom chambers 6A of the hoist cylinders 6 via the above-mentioned second check valve 24 and fourth check valve 29, respectively, upon occurrence of a pull-out, so that resisting force can be produced to abrupt retraction of the hoist cylinders 6. It is, therefore, possible to restrain such retraction. Therefore, the second check valve 24 and fourth check valve 29 constitute a kick-back restraining means.

If the quantities of oil in the rod chambers 6B of the hoist cylinders 6 become insufficient during a platform free-fall permitting operation, oil is drawn as much as needed into the rod chambers 6B via the first check valve 22 and third check valve 26, respectively. Therefore, the first check valve 22 and third check valve 26 constitute, together with the above-mentioned restrictor 12C1 at the switch position 12C of the second directional control valve 12, a means for permitting a smooth free fall of the load carrying platform 5 at a constant speed.

This embodiment is also provided with a switching control means capable of outputting pilot pressures to switch the first directional control valve 10 and second directional control valve 12. This switching control means comprises a first on-off valve 13, a second on-off valve 14, and a third on-off valve 15. The first on-off valve 13 has an ON position 13A capable of outputting a pilot pressure to realize a platform raising operation and an OFF position 13B enabling a platform stay holding operation. The second on-off valve 14 has an ON position 14A capable of outputting a pilot pressure to perform a platform free-fall permitting operation and an OFF position 14B enabling a platform stay holding operation. The third on-off valve 15 has an ON position 15A capable of outputting a pilot pressure to perform a platform forced-lowering operation and an OFF position 15B enabling a platform stay holding operation.

These first on-off valve 13, second on-off valve 14 and third on-off valve 15 are each constructed, for example, of a proportionally-controlled solenoid valve. The ON position 13A of the first on-off valve 13 is an ON position, at which a pilot pressure for performing a platform raising operation can be outputted to a left control port of the first directional control valve 10 and a left control port of the second directional control valve 12 via pilot lines 16,17, respectively. The ON position 14A of the second on-off valve 14 is an ON position, at which a pilot pressure for performing a platform free-fall permitting operation can be outputted to a right control port of the second directional control valve 12 via a pilot line 18. The ON position 15A of the third on-off valve 15 is an ON position, at which a pilot pressure for performing a platform forced-lowering operation can be outputted to a right control port of the first directional control valve 10 via a pilot line 19.

Although not illustrated in the figure, it is also designed that a pilot pressure delivered from a pilot pump driven by the engine 7 can be fed to all of the first on-off valve 13, second on-off valve 14 and third on-off valve 15. Responsive to each operation of an unillustrated control device, a switching signal is outputted from the unillustrated controller to the control part of the corresponding one of the first on-off valve 13, second on-off valve 14 and third on-off valve 15 to switch the corresponding one of these first on-off valve 13, second on-off valve 14 and third on-off valve 15 to the corresponding one of the ON positions 13A,14A,15A as needed.

This embodiment is also provided with a main relief valve 31 which can variably specify the delivery pressure from the hydraulic pump 8. This main relief valve 31 is set at a relatively low relief pressure upon performing a platform forced-raising operation, but upon performing a platform raising operation, is operated responsive to a pilot pressure outputted from the first on-off valve 13 to change its preset relief pressure to such a high relief pressure as making the hydraulic pump 8 produce a delivery pressure suited for the platform raising operation.

A description will hereinafter be made about the respective operations performed by this embodiment constructed as described above.

[Platform Raising Operation]

When a switching signal is outputted from the unillustrated controller to the first on-off valve 13 shown in FIG. 3 by operating the unillustrated control device, the first on-off valve 13 is switched to the OPEN position 13A. The second on-off valve 14 and third on-off valve 15 are held at the OFF positions 14B,15B, respectively. As a consequence, a pilot pressure delivered from the unillustrated pilot pump is guided into the pilot lines 16,17 via the first on-off valve 13 and is applied to the left control port of the first directional control valve 10, the left control port of the second directional control valve 12 and a control port of the main relief valve 31. As a result, the first directional control valve is switched to the switch position 10B and the second directional control valve 12 is switched to the switch position 12B. Further, the relief pressure of the main relief valve 31 is set at a relatively high pressure suited for a platform raising operation.

Accordingly, the pressure oil from the hydraulic pump 8 driven by the engine 7 is guided into the main line 9A via the switch position 10B of the first directional control valve 10 and is fed into the bottom chambers 6A of the hoist cylinders 6. In addition, the oil in the rod chambers 6B of the hoist cylinders 6 is returned to the reservoir 20 via the main line 11B and the switch position 12B of the second directional control valve 12. As a result, at an operating speed controlled by the restrictor 12B1 arranged at the switch position 12B of the second directional control valve 12, the hoist cylinders 6 extend to perform a raising operation, in other words, upward turning of the load carrying platform 5. Dumping of, for example, earth, sand or the like loaded on the load carrying platform 5 is performed accordingly.

[Pull-Out Restraining Operation]

Upon performing a platform raising operation, control is effected to prevent the extending operations of the hoist cylinders 6 from becoming excessively fast by the restrictor 12B1 at the switch position 12B of the second directional control valve 12 as mentioned above. Therefore, the turning speed of the load carrying platform 5 can be maintained relatively slow, and smooth dumping of earth, sand or the like on the load carrying platform 5 can be performed. It is, hence, possible to restrain the occurrence of a pull-out, that is, momentary extensions of the hoist cylinders 6 which may otherwise take place as a result of a sudden fall of blocks of earth, sand or the like from the load carrying platform 5.

Even if a pull-out should occur, the oil in the reservoir 20 is drawn as much as needed into the bottom chambers 6A of the hoist cylinders 6 via the second check valve 24 and the fourth check valve 29 at the time of the occurrence of such a pull-out. It is, accordingly, possible to restrain any kick-back as a back action after a pull-out as mentioned above.

When a pull-out occurs and the pressure of the rod chambers 6B of the hoist cylinders 6 becomes excessively high as mentioned above, the excessive pressure is relieved to the reservoir 20 via the first relief valve 27.

[Platform Forced-Lowering Operation]

When forcedly lowering the load carrying platform 5 by pressure oil delivered from the hydraulic pump 8, in other words, when downwardly turning the load carrying platform 5 located in an upper direction, for example, a switching signal is outputted from the unillustrated controller to the third on-off valve 15 shown in FIG. 3 by operating the unillustrated control device, and the third on-off valve 15 is switched to the OPEN position 15A. The first on-off valve 13 and second on-off valve 14 are held at the OFF positions 13B,14B, respectively. As a consequence, a pilot pressure delivered from the unillustrated pilot pump is applied to the right control port of the first directional control valve 10 via the third on-off valve 15 and the pilot line 19, and first directional control valve is switched to the switch position 10C. It is to be noted that the relief pressure of the main relief valve 31 is changed to a relatively low pressure because the pilot line 17 is brought into connection with the reservoir 20 via the OFF position 13B of the first on-off valve 13.

Accordingly, the pressure oil from the hydraulic pump 8 is guided into the main line 9B via the switch position 10C of the first directional control valve 10, and further, is fed into the rod chambers 6B of the hoist cylinders 6. In addition, the oil in the bottom chambers 6A of the hoist cylinders 6 is returned to the reservoir 20 via the restrictor 10C1 at the switch position 12C of the first directional control valve 10. As a result, at a lowering speed controlled by the restrictor 10C1, the load carrying platform 5 can be forcedly turned in the downward direction.

[Truck Frame Depression Restraining Operation]

When an excessively large depressing load is produced upon contact of the load carrying platform 5 with the truck frame 1 as a result of a downward turn of the load carrying platform 5, the pressure oil in the bottom chambers 6A of the hoist cylinders 6 flows out into the reservoir 20 via the main line 11A and the second relief valve 30. It is, therefore, possible to alleviate the slamming between the truck frame 1 and the load carrying platform 5.

[Platform Free-Fall Permitting Operation]

When permitting a free fall of the load carrying platform 5 staying still in the air, for example, subsequent to its upward turn, the unillustrated control device is operated to output a switching signal from the unillustrated controller to the second on-off valve 14 depicted in FIG. 3, and the second on-off valve 14 is switched to the ON position 14A. The first on-off valve 13 and third on-off valve 15 are held in the OFF positions 13B,15B, respectively. As a consequence, a pilot pressure delivered from the unillustrated pilot pump is fed to the right control port of the second directional control valve 12 via the second on-off valve 14 and pilot line 18. Hence, the second directional control valve 12 is switched to the switch position 12C.

At this time, the pressure oil from the hydraulic pump 8 is returned to the reservoir 20 via the center bypass passage at the switch position 12C of the second directional valve 12 and the center bypass passage at the neutral position 10A of the first directional control valve 10, and therefore, is not fed to the hoist cylinders 6. The oil in the bottom chambers 6A of the hoist cylinders 6, on the other hand, is returned to the reservoir 20 via the restrictor 12C1 at the switch position 12C of the second directional control valve 12. Upon performing this platform free-fall permitting operation, control is performed to prevent the descending speed from becoming excessively fast by the restrictor 12C1 as mentioned above.

Further, upon performing the platform free-fall permitting operation as mentioned above, the oil is replenished as much as needed from the reservoir 20 into the rod chambers 6B of the hoist cylinders 6 via the first check valve 22 and third check valve 26.

[Platform Stay Holding Operation]

When desired to hold the load carrying platform 5 still at a predetermined aerial position, for example, after a platform raising operation has been performed, switching control is performed to return the first on-off valve 13, which has been switched to the ON position 13A, to the OFF position 13B. Namely, a switching signal is outputted from the unillustrated controller to all of the first on-off valve 13, second on-off valve 14 and third on-off valve 15 so that the first on-off valve 13, second on-off valve 14 and third on-off valve 15 are controlled to hold the OFF positions 13B,14B,15B, respectively.

As a result, the first directional control valve 10 and second directional valve 12 return to their neutral positions 10A, 12A, respectively, the connections between the main lines 9A,9B,11A,11B and the reservoir 20 are cut off by the corresponding neutral positions 10A,12A of the first directional control valve 10 and second directional control valve 12, and therefore, the load carrying platform 5 is held still in the air. At this time, the pressure oil from the hydraulic pump 8 is also returned to the reservoir 20 via the center bypass passage at the neutral position 12A of the second directional control valve 12 and the center bypass passage at the neutral position 10A of the first directional control valve 10.

This invention can also perform the four basic operations, that is, the platform raising operation, the platform forced-lowering operation, the platform free-fall permitting operation and the platform stay holding operation as described above.

[Advantageous Effects of this Embodiment]

As mentioned above, this embodiment can perform each of the four operations, which consist of the platform raising operation, the platform forced-lowering operation, the platform free-fall permitting operation and the platform stay holding operation, by simply on-off controlling the first on-off valve 13, second on-off valve 14 and third on-off valve 15 to switch the corresponding one(s) of the first directional control valve 10 and second directional control valve 12. It is, therefore, possible to simplify the switching control of the first directional control valve 10 and second directional control valve 12. As the first directional control valve 10 and second directional control valve 12 each have only three switch positions including the neutral position 10A or 12A, they can be structurally simplified compared with conventional directional control valves as custom-made products having four switch positions. These first directional control valve and second directional control valve can, therefore, realize identical functions as the conventional directional control valves at relatively low manufacturing cost.

Owing to the arrangement of the restrictor 12B1 as a pull-out restraining means at the switch position 12B of the second directional control valve 12, this embodiment can restrain the occurrence of a pull-out which tends to take place during a platform raising operation, and therefore, can improve the workability.

As a load adjusting means for adjusting a depressing load of the load carrying platform 5 onto the truck frame 1 during a platform forced-lowering operation, this embodiment is provided with the second relief valve 30 in the line connecting the bottom chambers 6A of the hoist cylinders 6 and the reservoir 20 with each other. It is, therefore, possible to alleviate slamming between the load carrying platform 5 and the truck frame 1 upon contact of the load carrying platform 5 with the truck frame 1, and therefore, to prevent damages to these load carrying platform 5, truck frame 1 and hoist cylinders 6, thereby making it possible to assure their durability.

It is to be noted that the first on-off valve 13, second on-off valve 14 and third on-off valve 15 may be constituted by pilot-operated on-off valves that are on-off controllable by pilot pressures although they are constituted by solenoid valves in the above-described embodiment. It is also to be noted that the first on-off valve 13, second on-off valve 14 and third on-off valve 15 may be constituted by on-off controlled solenoid valves although they are constituted by proportionally-controlled solenoid valves in the above-described embodiment.

TABLE OF REFERENCE SYMBOLS

5 Load carrying platform
6 Hoist cylinder
6A Bottom chamber
6B Rod chamber
8 Hydraulic pump
9A Main line
9B Main line
10 First directional control valve
10A Neutral position
10B Switch position
10C Switch position
11A Main line
11B Main line
12 Second directional control valve
12A Neutral position
12B Switch position
12B1 Restrictor (pull-out restraining means)
12C Switch position
13 First on-off valve
13A ON position
13B OFF position
14 Second on-off valve
14A ON position
14B OFF position
15 Third on-off valve
15A ON position
15B OFF position
16 Pilot line
17 Pilot line
18 Pilot line
19 Pilot line
20 Reservoir
21 Line
22 First check valve
23 Line
24 Second check valve
25 Line
26 Third check valve
27 First relief valve
28 Line
29 Fourth check valve
30 Second relief valve (load adjusting means)
32 Main relief valve

The invention claimed is:

1. A hydraulic drive system for vertical pivoting movement of a load carrying platform, said hydraulic drive system being mountable on a dump truck and being provided with a hoist cylinder for vertically pivoting said load carrying platform, a hydraulic pump for feeding pressure oil to operate said hoist cylinder, a directional control valve arranged between said hydraulic pump and said hoist cylinder to control operations of said hoist cylinder and having switch positions for performing a platform raising operation to pivot said load carrying platform in an upward direction, a platform forced-lowering operation to forcedly pivot said load carrying platform in a downward direction by pressure oil delivered from said hydraulic pump, a platform free-fall permitting operation to pivot said load carrying platform in a downward direction by its own weight and a platform stay holding operation to enable holding of an aerial stay of said load carrying platform, respectively, and a switching control capable of outputting a pilot pressure to switch said directional control valve, wherein:

said directional control valve comprises:
a first directional control valve having a neutral position relevant to the platform stay holding operation and two other switch positions, and
a second directional control valve having a neutral position relevant to the platform stay holding operation and two other switch positions;
four switch positions, which consist of said two other switch positions of said first directional control valve and said two other switch positions of said second directional control valve, are assigned to said switch position relevant to the platform raising operation, said switch position relevant to the platform forced-lowering operation and said switch position relevant to the platform free-fall permitting operation; and
said switching control comprises:
a first on-off valve having an ON position capable of outputting a pilot pressure to perform said platform raising operation and an OFF position enabling said platform stay holding operation,
a second on-off valve having an ON position capable of outputting a pilot pressure to perform said platform free-fall permitting operation and an OFF position enabling said platform stay holding operation, and
a third on-off valve having an ON position capable of outputting a pilot pressure to perform said platform forced-lowering operation and an OFF position enabling said platform stay holding operation.

2. The invention as described above in claim 1, wherein:
said two other switch positions of said first directional control valve are said switch position relevant to platform raising operations and said switch position relevant to platform forced-lowering operations;
said two other switch positions of said second directional control valve are said switch position relevant to platform raising operations and said switch position relevant to platform free-fall permitting operations;
said ON position of said first on-off valve is an ON position capable of outputting said pilot pressure, which acts to perform said platform raising operation, to a control port of said first directional control valve and a control port of said second directional control valve;
said ON position of said second on-off valve is an ON position capable of outputting said pilot pressure, which acts to perform said platform free-fall permitting operation, to another control port of said second directional control valve; and
said ON position of said third on-off valve is an ON position capable of outputting said pilot pressure, which acts to perform said platform forced-lowering operation, to another control port of said first directional control valve.

3. The invention as described above in claim 2, further comprising:
a pull-out restraining means for restraining occurrence of a pull-out, which is a devastating extension of said hoist cylinder that may occur during said platform raising operation.

4. The invention as described above in claim 2, further comprising:
a load adjusting means for adjusting a depressing load on a truck frame of said load carrying platform during said platform forced-lowering operation.

5. The invention as described above in claim 1, further comprising:
a pull-out restraining means for restraining occurrence of a pull-out, which is a devastating extension of said hoist cylinder that may occur during said platform raising operation.

6. The invention as described above in claim 5, wherein:
said pull-out restraining means comprises a restrictor arranged at said switch position relevant to platform raising operations in corresponding one of said first directional control valve and said second directional control valve.

7. The invention as described above in claim 1, further comprising:
a load adjusting means for adjusting a depressing load on a truck frame of said load carrying platform during said platform forced-lowering operation.

8. The invention as described above in claim 7, wherein:
said load adjusting means comprises a relief valve arranged in a line connecting a bottom chamber of said hoist cylinder and a reservoir with each other.

* * * * *